June 15, 1937.   T. E. ALDHAM   2,083,546
OIL FILTER
Filed June 20, 1933
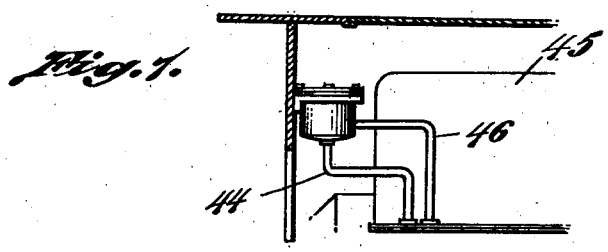
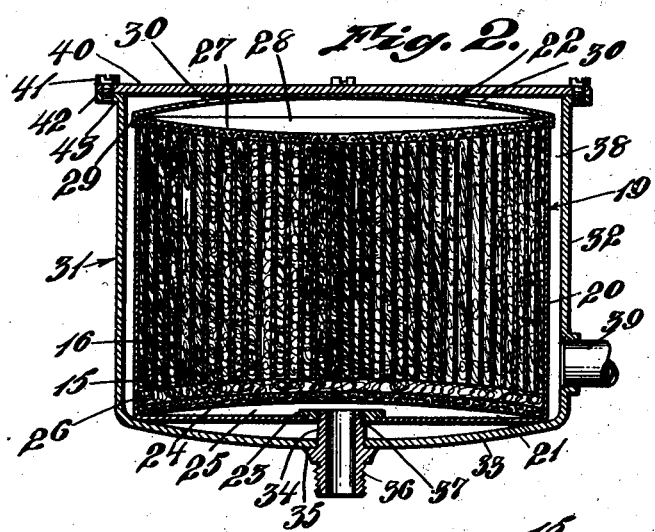
INVENTOR.
Thomas Edward Aldham
BY Barlow & Barlow
ATTORNEYS.

Patented June 15, 1937

2,083,546

UNITED STATES PATENT OFFICE 2,083,546

OIL FILTER

Thomas Edward Aldham, Providence, R. I.

Application June 20, 1933, Serial No. 676,675

7 Claims. (Cl. 210—131)

This invention relates to a means for improving any used lubricating oil more particularly for the filtering of any lubricating oil, and particularly such oil as is used in the crank case of a motor vehicle, and has for one of its objects the provision of a material which will improve a used lubricating oil when brought in contact therewith.

Another object of the invention is the provision of a filter material which is of such a character that it will filter out solid particles and other injurious matter which have collected in the lubricating oil either while in the process of lubrication or in the re-refining of the oil after use.

Another object of the invention is to conserve lubricating oil by enabling it to be used longer without deterioration.

Another object of the invention is to improve the appearance as well as the quality of the lubricant whether it be of animal, mineral or vegetable origin.

Another object of the invention is the provision of a filter material which will chemically act upon the lubricating oil to remove any acids formed by oxidization of the oil or introduced by the gasoline.

Another object of the invention is the use of a filtering material which has these desirable qualities which will be inexpensive to procure and thus one which can be economically commercially used.

Another object of the invention is the provision of means for packing this material in such a way that it will better act for the filtration and the distribution of the liquid.

Another object of the invention is the provision of means which will distribute the pressures received by a pumping of the oil through the filter in a manner to prevent tightly packing of the material in the filter.

A further object of the invention is the provision of means for preventing the end wall of the filter from bulging due to pressures exerted during the filtering.

With these and other objects in view, the invention consists of certain novel features of construction, as will be more fully described, and particularly pointed out in the appended claims.

In the accompanying drawing:

Fig. 1 is a fragmental diagrammatic view illustrating the filter as mounted upon the dashboard of a motor vehicle with conduits leading to suitable points for receiving and delivering the lubricant passed through the filter.

Fig. 2 is a sectional view through the container and cartridge therein.

Fig. 3 is a perspective view of the filtering material.

Fig. 4 is an end view of the spirally rolled filter material.

It has been experienced in motor vehicle lubrication that particles of carbon, road dirt, or other abrasives accumulate in the crank case oil which detrimentally act upon the machined surfaces of the motor and require frequent changing of the lubricating oil, and in order that the accumulation of solid particles such as carbon, road dirt, or other abrasives may be kept to a minimum in the lubricating system filters are used to remove these particles and it is found in the use of such filters that frequently the filtering material which is in some cases cotton waste or cotton fibers, becomes packed too solidly in the filter by reason of the pressures exerted and thus unduly retard the flow of the liquid, which is undesirable. Also, it is found that through oxidization of the lubricating oil or by injection from the gasoline used a certain acidity is acquired which may, if accumulation occurs too far, be detrimental upon the working parts of the engine, and in order to avoid these undesirable results and at the same time provide a filtering material which is better than cotton waste, cotton linters or such fibrous material, I have used a rock wool which is commercially known in the trade under the name of "Home Insulation", although unknown for use as here disclosed, which is a finely divided product containing largely silicates of metals, which has heretofore been used as packing material but which I find by reason of its alkaline nature has qualities peculiarly valuable for a filter as it will remove any acidity in the lubricating oil and also is of such a character as to better remove carbon particles or other foreign matter which may accumulate in the lubricating oil; and in order that this finely divided material may be advantageously used in the filter I have packed the same in a manner to distribute the pressure and in some cases so as to prevent the pressure from the upper part of the material from being transmitted to the lower part of the material and thus prevent detrimental packing of this material through which the oil is to be passed; and the following is a more detailed description of the present embodiment of this invention illustrating the preferred means by which these advantageous results may be accomplished:—

The new material which I use is a rock wool and is known as "Home Insulation" as it is largely used as an insulation for buildings. It is of a rather finely divided nature such as spun glass, and is said to be formed by melting the material and blowing steam or air therethrough which causes it to be formed in rather fine shreds. The material develops upon analysis substantially.

|  | Percent |
|---|---|
| Silicon dioxide $SiO_2$ | 40 |
| Magnesium oxide | 36 |
| Calcium oxide | 14 |
| Aluminum oxide | 10 |

It is customary to report the analysis of silicates in terms of oxides, but it is understood that the metallic oxides are combined with the silica or silicon dioxide which is the case with this material.

By reason of this composition it is alkaline in nature and has a basic reaction and will thus remove any acid developed in the lubricant when contacted therewith. This material is of an inexpensive nature and may be purchased on the market but this use of it has not before been known. Also it will more quickly remove solid particles from the oil by passage of the same through this material as a filter than will cotton waste, wool or any other filter material that I have tried. In tests, I have found that this will clear up the oil in much less time than when the same oil is run through cotton waste, cotton linters or other fibrous material which are frequently used in filters of this character.

This rock wool which I use and with which the lubricant contacts is packed for filtering purposes in a particular manner. A layer of the rock wool designated 15 is placed upon a backing material 16 which may be screen cloth, wire mesh, or some desired supporting material which I will vary depending upon the amount of pressure developed by the pump which is to force the oil through the filter. After the rock wool is laid out in this manner the same will be rolled in a spiral manner as indicated at 17 in Fig. 3 as tightly as desired depending on the retardation of flow desired until there is formed a roll 18 having a diameter which will tightly fit the inside of the cartridge 19 which is of substantially cylindrical form having side walls 20, bottom wall 21 and top wall 22. When positioned in this cylindrical cartridge and released the screen cloth or backing material 16 and the rock wool being inherently of a somewhat springy nature, will cause the package to spring outwardly slightly and engage the inner surface of the cylindrical cartridge 19 firmly and thus be securely held in position.

This cylindrical cartridge is provided with a bushing 23 having a threaded opening which bushing is suitably inserted and secured at the center of the bottom wall 21 in an opening provided therefor while above this bottom wall there is provided a screen 24 of metal which is slightly domed, as illustrated in Fig. 2 so as to form a shallow chamber 25 between this screen and the bottom of the cartridge 21. Above this screen, a layer of some material 26, which will felt together, is provided such as cotton waste or cotton linters so as to prevent the finely divided rock wool which is between the layers of backing material 16 from sifting through the screen 24. At the upper portion of the cartridge there is a similar screen 27 which is bulged inwardly, as illustrated in Fig. 2, to form a chamber 28 between it and the top wall 22 of the cartridge, which top wall 22 has a flange 29 to fit over the cylindrical wall and be soldered in place. This cover has openings 30 spaced at suitable points to provide finger holes for the overflow of the oil therefrom.

The outside casing is of generally the same shape as the cartridge and designated generally 31. It consists of cylindrical side walls 32 and a bottom wall 33 with a nipple 34 secured in position in the bottom wall by the welding of the flange 35. This nipple has a threaded outer end 36, and its inner end is threaded as at 37 so that when the cartridge is placed into the outer casing the bushing 23 may be threaded onto the inner portion of this nipple to cause the cartridge to be centrally mounted in the casing to leave a space 38 thereabout and also provide a sealed connection for the delivery of the oil to be filtered.

As the oil enters through the nipple 34 it will fill the chamber 25 in the cartridge and then be forced upwardly through the cartridge where it will accumulate and fill the chamber 28 and then run over and out of the openings 30, thence downwardly about the cartridge in the chamber or space 38 and outwardly through the discharge pipe 39 secured in position in the cylindrical wall 32, thence to its collection point, thus the flow of oil is upward through the filter. This casing 31 is sealed by a cover plate 40 engaging the top wall 22 which is somewhat resilient and tightly maintains the cartridge in position, the cover being held in place by suitable bolts 41 extending through the cover and into the threaded openings 42 in the flange 43 of the casing.

In use the filter is connected to a conduit 44 of an engine 45 for the delivery of oil to the filter while the return conduit 46 carries the oil back to the crank case after it has been sufficiently treated by the rock wool and the solid particles removed.

The foregoing description is directed solely towards the construction illustrated, but I desire it to be understood that I reserve the privilege of resorting to all the mechanical changes to which the device is susceptible, the invention being defined and limited only by the terms of the appended claims.

I claim:

1. In a liquid filter, a cartridge comprising spirally arranged supporting walls of foraminated material and mineral wool between said spiral supporting walls, said cartridge having openings arranged to afford an axial flow of the liquid thru the cartridge.

2. In a liquid filter, a cartridge comprising spirally arranged supporting walls of foraminated material, and finely divided filtering material between said spiral walls, said cartridge having openings arranged to afford an axial flow of the liquid thru the cartridge, and a horizontally arranged layer of filtering material below said spiral layers.

3. In a liquid filter, a cartridge comprising spirally arranged supporting walls of foraminated material, and loosely assembled filtering material between said spiral walls, said cartridge having openings arranged to afford an axial flow of the liquid thru the cartridge, and a horizontally arranged mass of loosely assembled filtering material below said spiral layers.

4. In a liquid filter, a replaceable cartridge casing unit comprising within said casing a vertically arranged supporting wall of material inherently self-supporting and materially resistant to edgewise compression arranged generally parallel to the axis of the cartridge, loosely assembled filter material unmatted and shapeless when in unsupported position along and in contact with said wall and supported thereby, said material completely filling the cartridge along a lateral section except for said wall, said wall leading the liquid to be filtered along it to afford a flow of liquid through the cartridge parallel to the axis thereof.

5. In a liquid filter, a replaceable cartridge casing unit comprising within said casing spirally arranged supporting wall of material inherently self supporting and materially resistant to edgewise compression, and unwoven, loosely assembled filtering material shapeless when in unsupported position completely filling the space between said spiral wall, said cartridge having openings arranged to afford an axial flow of the liquid through the cartridge.

6. In a liquid filter, a replaceable cartridge casing unit comprising within said casing spirally arranged supporting wall of wire mesh and loosely assembled filtering material shapeless when in unsupported position completely filling the space between said spirals of wire mesh and entering the spaces thereof, said wire mesh tending to spring outwardly and limited by said casing, said cartridge having a vertical axis with its openings arranged to afford an axial flow of the liquid through the cartridge.

7. In a liquid filter, a replaceable cartridge casing unit comprising within said casing a vertically arranged, single ply supporting wall arranged to provide a space for filter material, a single ply of loosely assembled filter material shapeless when unsupported and completely filling said space, each ply having substantially the same cross section at any point along the vertical extent, said wall being of wire mesh and spirally arranged and said filter material entering the spaces in said wire mesh.

THOMAS EDWARD ALDHAM.